April 28, 1964    A. J. A. GIERS ET AL    3,130,576
MEANS FOR DYNAMIC ANALYSIS OF UNBALANCE
Filed May 14, 1959    2 Sheets-Sheet 1

United States Patent Office 3,130,576
Patented Apr. 28, 1964

3,130,576
MEANS FOR DYNAMIC ANALYSIS OF UNBALANCE
Alfred J. A. Giers, Rossdorf, near Darmstadt, and Otfried G. H. Maus, Darmstadt, Germany, assignors to Carl Schenck, Maschinenfabrik G.m.b.H., Darmstadt, Germany, a German corporation
Filed May 14, 1959, Ser. No. 813,262
Claims priority, application Germany May 16, 1958
3 Claims. (Cl. 73—66)

Our invention relates to devices for dynamically testing a workpiece for unbalance relative to a desired gravity center or axis.

The methods and devices known for such purposes require maintaining the specimen in rotation at relatively high and uniform speed while performing the test, so that any unbalance will manifest itself by centrifugal forces or moments which can be measured. This requires an exacting design of the driving and journalling means for the specimens particularly if heavy workpieces are involved.

The expression "dynamic balancing" as used herein is intended to be considered not in a narrow sense but to encompass stable balancing and balancing of an unbalance couple.

It is an object of our invention to devise devices which afford a dynamic unbalance analysis in a particularly simple manner and with the aid of simplified workpiece-mounting structures of smaller space requirements.

Another object is to afford a dynamic testing for unbalance with respect to bodies that, due to their design or mounting, cannot, or not readily, be placed in continuous rotation about the desired gravity axis during the test.

According to our invention, we measure the unbalance of a specimen, in one or more given reference planes and relative to a desired gravity center or gravity axis, by subjecting the specimen to substantially linear oscillations applied from an extraneous oscillation generator in a neutral direction, namely in such a direction that the specimen, if perfectly balanced, would exhibit responsive oscillation only in that direction. As a result, an unbalanced specimen responds by exhibiting compound oscillatory displacements, stresses or moments which, aside from the extraneously enforced oscillation component in the above-mentioned direction, have another pivotal or rotary component of oscillation; and we measure this other, pivotal component of oscillation as indicative of the unbalance data to be determined.

According to one of the more specific features of our invention, we mount the specimen, to be tested for unbalance, so as to be capable of pivotal motion about a point on the desired gravity axis, and we impose substantially linear oscillations from without upon the specimen in a non-tangential direction whereby the specimen, if unbalanced, is excited not only to enforced linear oscillatory motion in that direction but also to pivotal oscillatory motion about said point, such pivotal motion being sensed as a measure of the unbalance to be determined.

A preferred way of performing the method just-mentioned is to journal the specimen for rotation about a given axis and to excite it from a separate oscillation generator to oscillate in a plane perpendicular to that axis, whereby the specimen, if unbalanced, is caused to not only oscillate linearly in the direction of the applied oscillations but to also become subjected to rotary oscillatory forces, moments or angular movements about the above-mentioned axis, these rotary oscillatory phenomena being sensed as a measure of unbalance.

The invention permits determining unbalance of a rotor in a single reference plane or in two axially spaced reference planes. Particularly advantageous, for unbalance analysis relative to a single radial plane of reference, is a device wherein the specimen rotor is journalled on a spindle which is excited by the separate oscillation generator to perform periodic oscillations perpendicular to the axis of rotation and which is provided with means for transmitting any resulting unbalance deflections of the rotor about the axis of rotation to one or more oscillation pickups or the like electric transducers. For unbalance analysis in two reference planes, it is preferable to rotatably accommodate the rotor on a rigid frame which is excited to perform pendulous oscillatory movements in a given direction perpendicular to the rotor axis and about a fulcrum axis transverse to the rotor journalling axis, the fulcrum axis of the pendulous frame being displaceable along that journalling axis. Methods and devices according to the invention do not require a drive for maintaining the rotor in rotation during balance testing, whereby a considerable reduction in cost of the equipment is afforded. Furthermore, since forces as great as occurring during rotational operation in the known devices, are absent in the devices according to the invention, the journal bearings and other auxiliaries can be given a simpler design and less weight, which also contributes to reducing the cost of the equipment. Another advantage is the fact that the rotor, after completing the measuring operation, is always located in the same position relative to the gravity center of its unbalance, thus eliminating the difficulties encountered with the known methods and devices relative to the exact transmission of the unbalance angle when correcting the measured unbalance.

For the purposes of the invention, the oscillating or pendulous movements of the specimen may be excited by inertia-type oscillation generators, crank drives, electromagnetic vibrators, or any other means known as such for producing periodic, preferably sinusoidal, vibrations. The oscillating system may be tuned to any desired sub-critical, super-critical, or resonance frequency. The sensing of the resulting rotary oscillations of the rotor may be effected by a device similar to the known Geiger torsionograph which comprises a reference mass that may likewise be tuned sub-critically, super-critically, or in resonance. However, the response to the rotary oscillations of the rotor may also be effected by any other pickup means known for vibration-sensing purposes.

For determining the maximum or minimum deflection to which the rotor is subjected due to any inherent unbalance, the specimen is slowly turned about its geometric axis during the oscillation generating and measuring operation. During such slow rotation, the position of the rotor occupied when the maximum or minimum deflections in the measuring instruments take place is determined. The slow rotation can be imparted to the rotor by hand or by any suitable drive. In the latter case the drive is preferably coupled with the rotor through an elastic member.

A preferred way of sensing the oscillatory, rotary movements of the rotor due to its unbalance, is to impart such rotary oscillations to a pickup of the known transducer type which translates the oscillations into electric voltage or current. The voltage or current is then indicated in suitable electric measuring instruments in the known manner, if desired with the aid of an intermediate amplifier. Such measuring instruments may simply consist of conventional current or voltage indicators. However, the known wattmetric measuring method can also be employed. In this case, the wattmetric instrument is supplied on the one hand with voltage from the oscillation pickup and, on the other hand, with a reference voltage generated by a phase transmitter that rotates in synchronism with the oscillation generator. Also applicable as oscillation pickups are force-measuring gauges, electrets and similar devices known for force measuring purposes; or the rotary oscillations may be determined by optical means.

The transfer of the unbalance-responsive rotary oscillations from the rotor to the oscillation pickups may also be effected by means of a roller that forms part of a roller bearing for journalling the rotor. If desired, a transmission gearing, or a friction clutch may be interposed between the roller and the pickup. It is further possible to accommodate the rotor on an auxiliary shaft directly connected with the known torsiograph. When determining the unbalance in two reference planes with the aid of a mechanical frame structure, the frame itself may be mounted so as to be capable of pendulous movement about the geometric axis of rotation of the rotor to be tested, and the frame may be braced against oscillation pickups. The oscillation pickups, furthermore, may be mounted in the gimbal block for the oscillatingly mounted frame.

Further objects, advantages and features of the invention will be described hereinafter and will be apparent from the embodiments illustrated by way of example on the accompanying drawings in which.

Figure 1:
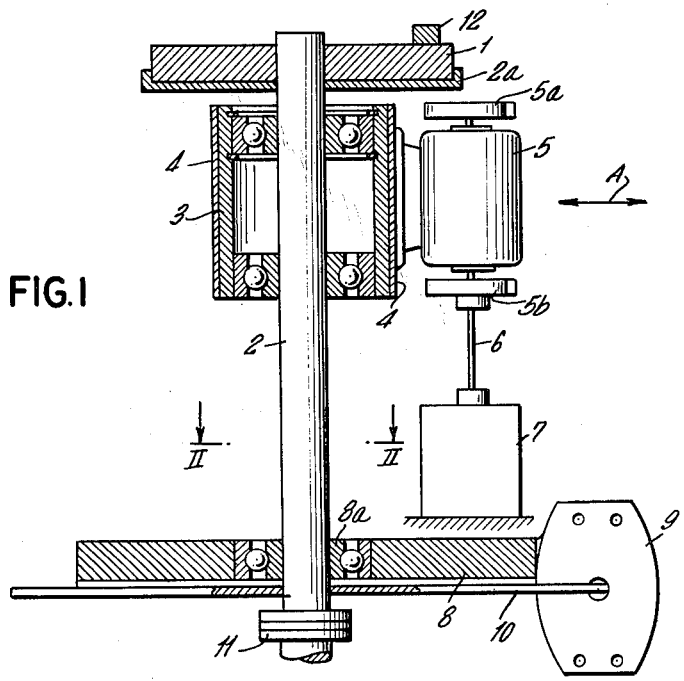
FIG. 1 is an axial section and FIG. 2 a top view of a device for unbalance analysis in a single plane of reference.
Figure 2:
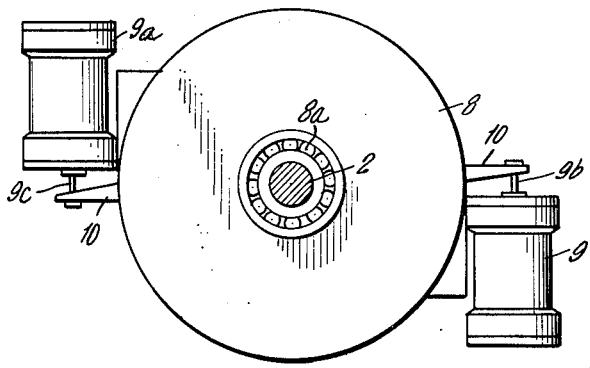

According to FIGS. 1 and 2, a workpiece rotor 1 to be balance-tested relative to a single radial reference plane is coaxially mounted on a chuck or holder 2a whose shaft 2 is journalled by ball bearings in a bushing 3. The bushing is mounted on the rigid machine base or frame structure (not shown) by means of two leaf springs 4 which extend perpendicular to the plane of illustration in FIG. 1 and permit the bushing 3 to perform oscillations in the plane of illustration and in the direction denoted by a double-headed arrow A. An oscillation generator 5 is mounted on bushing 3 and consists essentially of an electric motor whose shaft carries unbalanced discs 5a and 5b so that, during rotation of the motor shaft, the bushing 3 is excited to perform the above-mentioned oscillations at a frequency corresponding to the motor speed. A flexible or cardanic shaft 6 connects the shaft of the oscillation generator 5 with the shaft of a phase-reference voltage transmitter 7 so that the reference voltage is in synchronism with the frequency of the oscillations produced by the oscillation generator 5. The phase-reference transmitter 7 may consist of a dynamo furnishing a sinusoidal voltage.

Mounted on shaft 2, near the end remote from rotor 1, is a reference mass 8 which is seated on shaft 2 by means of a ball bearing 8a so as to be freely rotatable relative to the shaft. Rigidly connected with the reference mass 8 are two electro-dynamic oscillation pickups 9 and 9a (FIG. 2). The reference mass 8, including the oscillation pickups mounted thereon, is accurately calibrated for balance of the entire reference assembly.

An arm 10 of smallest feasible mass or weight is rigidly connected with the shaft 2 in order to transmit any rotary oscillation of the shaft to the sensing members 9b, 9c of the respective pickups, each sensing member being movable relative to the pickup coil to generate a pickup voltage.

The shaft 2 is connected through a soft-elastic coupling 11 with a drive (not illustrated) which, when in operation, imparts slow rotation to the shaft 2. However, in lieu of such a drive, the shaft 2 may be turned by hand, since the speed of shaft revolution is not essential to the unbalance analysis and may be as slow as desirable, for example one revolution or less per second.

The device operates as follows. After mounting the rotor 1 to be tested, the oscillation generator 5 is energized and kept energized. Then the rotor 1 is slowly rotated about its axis by turning the shaft 2. Any unbalance inherent in the rotor produces a torque which causes rotary oscillations of rotor 1 and shaft 2 about the rotor axis. The reference mass 8, due to its inertia, does not participate in such rotary oscillations. Consequently, the arm 10 transmits the relative oscillatory motion between shaft 2 and reference mass 8 to the sensing member of pickups 9 and 9a. The pickups thus produce alternating voltages that correspond to the rotary oscillations. When the rotor 1 is turned to such a position that the center of unbalance is located perpendicularly to the direction of excitation indicated by the arrow A, the voltage produced in the oscillation pickup 9 reaches a maximum. Consequently, by observing the occurrence of the voltage maximum, the location of the unbalance center can be determined. On the other hand, when the rotor 1 is turned so that the voltage of pickup 9 is a minimum, the unbalance radius is located in the direction of excitation denoted by the arrow A. In this manner, the unbalance of the rotor can be determined as regards its angular position and magnitude.

For calibrating the magnitude of the unbalance, indicated by the amount of the voltage maximum, a calibrating mass 12 (FIG. 1) of known weight can be mounted on the rotor 1 at a location 90° displaced from that of the unbalance. The voltages, i.e. the corresponding instrument deflections caused by the known calibrating weight 12, are observed in the minimum position of the unbalance and then permit a conclusion as to the magnitude of unbalance. The added calibrated weight cannot affect the analysis of the rotor unbalance because this weight is located in the neutral minimum position when the unbalance is in the maximum-voltage position.

The unbalance can be compared in a quotient measuring instrument with the voltage from the phase transmitter 7 in accordance with the known wattmetric method. Another way is to indicate the pickup voltages in conventional voltage-measuring instruments.

Figure 3:
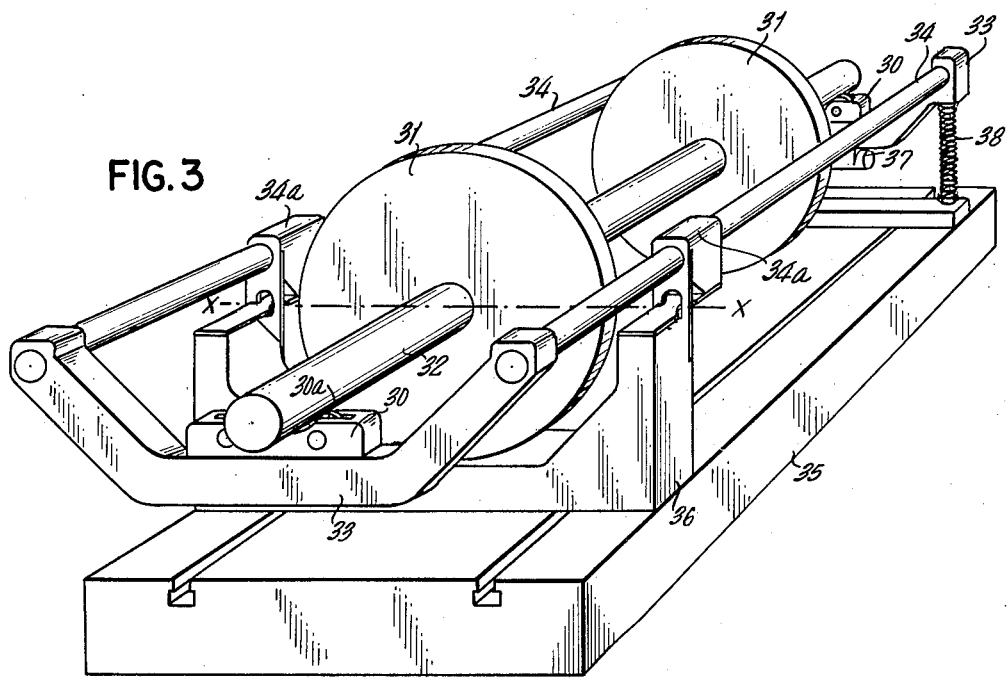
FIG. 3 is a schematical perspective view of a device for determining unbalance in two reference planes.

In the embodiment according to FIG. 3, serving for analyzing rotor unbalance in two radial reference planes, the rotor workpiece 31 is journalled by means of a shaft 32 on two roller-bearings 30 mounted on respective bridge members 33 which form a rigid journalling frame together with two longitudinal beams 34. A bearing support 36 is displaceable along a slideway of the machine bed structure 35. Displaceably mounted on the respective rods 34 are two sleeves 34a which are pivoted to the support 36. The journalling frame is pendulously movable about the fulcrum axis denoted in FIG. 3 by X—X. This axis of pendulous motion is displaceable by shifting the support 36 along the bed structure 35. The journalling frame for the rotor possesses no other degree of freedom. The frame is excited to pendulous motion about the axis X—X by means of any suitable oscillation generator, for instance as schematically indicated at 37. Adjustable springs 38 permit defining a horizontal midposition of the journalling frame.

When the rotor is mounted on a journalling frame as shown in FIG. 3 and the journalling frame is being excited to pendulous oscillations about the axis X—X, the rotor shaft 32 is slowly turned by hand or by a suitable slow-motion drive so that the oscillatory, rotary deflection of the rotor becomes a maximum and a minimum in respective discrete positions, to effect an unbalance indication in the manner explained above with reference to FIGS. 1 and 2. In order to prevent creeping due to gravity during measurement, suitable stop means, such as a collar on shaft 32, or a flexible coupling similar to coupling 11 in FIG. 1 may be employed.

The rotary oscillations caused by unbalance of the rotor being tested, can be transmitted to oscillation pickups by means of a device corresponding to Geiger's torsiograph as described above with reference to FIGS. 1 and 2. However, the rotary oscillations may also be transmitted to oscillation pickups by coupling them with the rollers 30a of the journal bearings 30. Two other ways of transmitting the oscillations of the journalling frame to pickups are shown in FIGS. 4 and 5.

Figure 4:
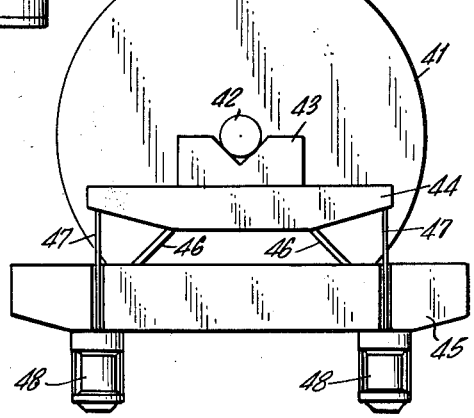
FIG. 4 shows schematically a front view of a modified journalling structure applicable in a device otherwise according to FIG. 3.

According to FIG. 4, the shaft 42 of the rotor 41 is journalled in a prismatic glide bearing 43. The bearing 43 is rigidly joined with a measuring bar 44 and so supported on the bridge member 45 of the pendulous frame structure that the friction causes the bearing 43 to perform rotational oscillations about the axis of shaft 42 relative to member 45 which forms a reference mass comparable to mass 8 in FIGS. 1, 2. The bar 44 is supported on bridge 45 by struts 46 which extend in respective radial directions relative to the axis of shaft rotation. In lieu of such struts, ball bearings or glide bearings may be used. The axis of rotation of the bearing 43 must be aligned with the geometric axis of shaft 42 at least with respect to the vertical direction. The rotary oscillations are transmitted from the measuring bar 44 through sensing rods 47 to respective oscillation pickups 48.

Figure 5:
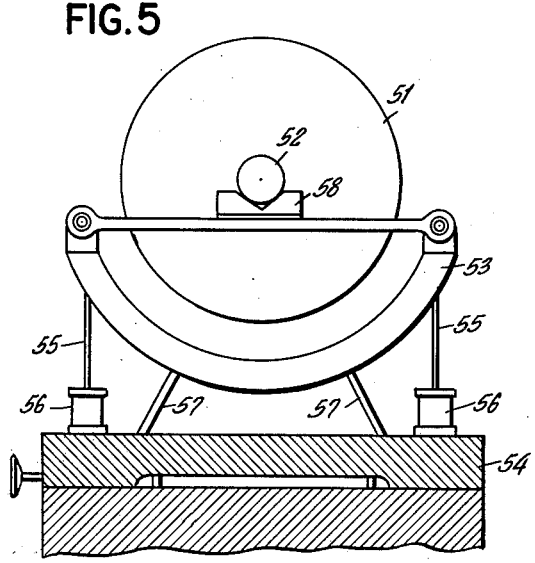
FIG. 5 is a similar schematic view of another modified embodiment of a journalling structure, also applicable in a device according to FIG. 3.

According to FIG. 5, the rotor 51 has its shaft 52 journalled in a frame structure 53 in such manner that the rotor, together with the journalling frame, can perform not only a pendulous motion about the axis X—X (FIG. 3) but also a rotary oscillation about the axis of the shaft 52. For this purpose, the supporting structure 53 for the bearing 58 is connected with a base block 54 by leaf springs 57 which extend radially with respect to the axis of rotation and are so oriented that the imaginary upward extensions intersect each other on a vertical line passing through the axis of rotation. The rotary oscillations of the frame structure, due to friction in bearing 58, are transmitted by sensing rods 55 to the respective oscillation pickups 56 mounted on base 54.

It will be obvious to those skilled in the art, upon studying this disclosure, that my invention permits of various other modifications and hence may be embodied in devices other than particularly illustrated and described herein, without departing from the essential features of our invention and within the scope of the claims annexed hereto.

We claim:

1. Device for measuring unbalance of a specimen in a given reference plane and about a desired gravity axis of the specimen, comprising mounting means for coaxially holding the specimen, said mounting means being reciprocable in a given direction other than a rotary direction about said axis, an oscillation generator connected with said mounting means for imparting thereto oscillations in said given direction whereby the specimen, aside from said imparted oscillations, is subjected to rotary oscillations about a point on said axis if the specimen is unbalanced, and oscillation sensing means responsive to said rotary oscillations to provide a magnitude indicative of the unbalance of the specimen, said mounting means comprising a rigid frame structure having bearing means for journalling the specimen for rotation about said axis, said frame structure being pendulously reciprocable about a fulcrum transverse to said axis, said oscillation generator being connected with said frame structure for exciting it to pendulous oscillation about said fulcrum, and said sensing means being responsive to rotary oscillation of the specimen about said axis, a support pivotally engaging said frame structure to define said fulcrum, said support being displaceable along said frame structure for shifting said fulcrum along said axis of rotation.

2. Device for measuring unbalance of a specimen in a given reference plane and about a desired gravity axis of the specimen, comprising mounting means for coaxially holding the specimen, said mounting means being reciprocable in a given direction other than a rotary direction about said axis, an oscillation generator connected with said mounting means for imparting thereto oscillations in said given direction whereby the specimen, aside from said imparted oscillations, is subjected to rotary oscillations about a point on said axis if the specimen is unbalanced, and oscillation sensing means responsive to said rotary oscillations to provide a magnitude indicative of the unbalance of the specimen, said mounting means comprising a rigid frame structure having bearing means for journalling the specimen for rotation about said axis, said frame structure being pendulously reciprocable about a fulcrum transverse to said axis, said oscillation generator being connected with said frame structure for exciting it to pendulous oscillation about said fulcrum, and said sensing means being responsive to rotary oscillation of the specimen about said axis, a base on which said frame structure is pivotally mounted for pendulous motion about said fulcrum, and spring means mounted on said base and engaging said frame structure for defining a zero position of said frame structure.

3. Device for measuring unbalance of a specimen in a given reference plane and about a desired gravity axis of the specimen, comprising mounting means for coaxially holding the specimen, said mounting means being reciprocable in a given direction other than a rotary direction about said axis, an oscillation generator connected with said mounting means for imparting thereto oscillations in said given direction whereby the specimen, aside from said imparted oscillations, is subjected to rotary oscillations about a point on said axis if the specimen is unbalanced, and oscillation sensing means responsive to said rotary oscillations to provide a magnitude indicative of the unbalance of the specimen, said mounting means comprising a rigid frame structure having bearing means for journalling the specimen for rotation about said axis, said frame structure being pendulously reciprocable about a fulcrum transverse to said axis, said oscillation generator being connected with said frame structure for exciting it to pendulous oscillation about said fulcrum, and said sensing means being responsive to rotary oscillation of the specimen about said axis, said bearing means being rotationally movable about said axis relative to said rigid frame structure so as to be capable of being entrained by said rotary oscillations about said axis, and means for transmitting the entrained rotary motion from said bearing means to said sensing means.

References Cited in the file of this patent

UNITED STATES PATENTS

| | | |
|---|---|---|
| 959,699 | Benson | May 31, 1910 |
| 984,354 | Cunningham | Feb. 11, 1911 |
| 2,088,553 | Olsen | July 27, 1937 |
| 2,128,673 | Holmstrom et al. | Aug. 30, 1938 |
| 2,185,843 | Fraser | Jan. 2, 1940 |
| 2,197,808 | Mason | Apr. 23, 1940 |
| 2,731,834 | Fehr et al. | Jan. 24, 1956 |
| 2,995,934 | Adams et al. | Aug. 15, 1961 |

FOREIGN PATENTS

| | | |
|---|---|---|
| 586,976 | Great Britain | Apr. 9, 1947 |
| 547,965 | Canada | Oct. 29, 1957 |

OTHER REFERENCES

Page 35, Kimball's College Physics by Wold, published 1939, by Henry Holt & Co., New York.